Oct. 30, 1956 J. JARVIS 2,769,132

NOISE ELIMINATOR FOR AUTOMATIC PILOT SYSTEMS

Filed April 4, 1952

INVENTOR.
JOHN JARVIS
BY
ATTORNEY

United States Patent Office 2,769,132

Patented Oct. 30, 1956

2,769,132

NOISE ELIMINATOR FOR AUTOMATIC PILOT SYSTEMS

John Jarvis, Dumont, N. J., assignor to Bendix Aviation Corporation, Teterboro, N. J., a corporation of Delaware Application April 4, 1952, Serial No. 280,678

5 Claims. (Cl. 318—489)

Figures 1, 2:
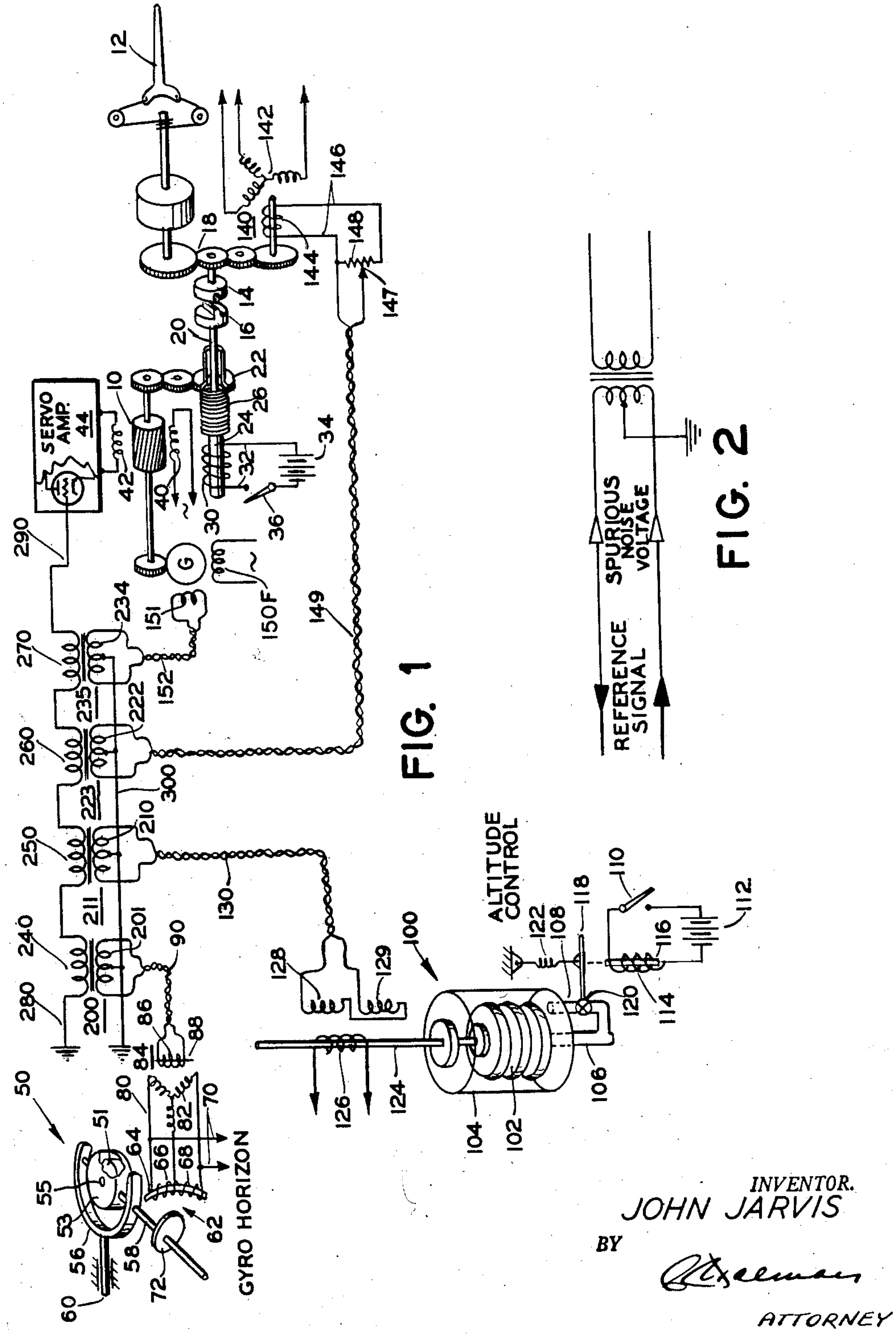

This invention relates generally to automatic control systems for aircraft or other mobile vehicles and more particularly to the reduction or elimination or extraneous and unwanted spurious signals which affect such systems.

Electrical circuits are seldom entirely isolated. Each circuit sets up a surrounding electrical field which extends out into space. Each circuit, in turn, is subjected to extended fields from other circuits. The extended field of one circuit interferes with adjacent neighboring circuits, producing a spurious voltage in the neighboring circuit. Unwanted signals such as this spurious voltage are called noise.

Noise pick-up presents a serious problem in present automatic pilot systems. The effect of this noise pick-up is to reduce the sensitivity, accuracy, and efficiency of the system. The large number of signal generators used and the great size of the crafts that are now controlled by automatic pilots result in lengthy and complex wiring arrangements. The electrical circuits are necessarily close together. Thus, ample opportunity is afforded each circuit for spurious voltage pick-ups from other circuits and from other electrical apparatus on the craft.

The final control signal of the automatic pilot is generally a signal obtained from a combination of signal sources. The length of wire required to connect these sources with the controlled element results in a large impedance from the far wire terminal to the near wire terminal and to ground. The result is a greater noise potential. Furthermore, the signal sources are connected in series. Each added signal source, therefore, results in added lengths of wiring and consequently, in more impedance. The different ground potentials of the signal stations connected by the transmitting wire may also be a source of spurious voltage or noise signals.

In automatic pilot systems the signal potential is low and the gain is high. Extraneous noise signals may easily cause control actions on the craft that are not at all representative of the control action that is needed.

The use of shielding for reducing noise pick-up has not been satisfactory. Shielding is particularly unsuitable for use in aircraft automtaic pilot systems. Shielding is heavy and requires extra terminals through the bulkheads. Also, the shielding, to show any worthwhile improvement in diminishing noise pick-up, must be entirely insulated from ground except at one selected point. This means that, for proper operation, the shielding must be tested for continuity and for grounds; yet, such testing is virtually impossible.

An object of the present invention, therefore, is to provide a novel means for reducing or eliminating the effect of extraneous spurious signals in automatic pilot systems.

Another object is to provide a novel noise elimination means embodying a novel coupling arrangement for the series addition of reference signals in an automatic pilot system wherein the resultant control signal will be independent of noise pick-up due to the lengths of wiring necessary to transmit the signals from the signal developing means to the servomotors.

A further object is to provide a novel arrangement to facilitate the summation of signals from the various sensors of an automatic pilot system.

The above and other objects and advantages of the invention will appear more fully hereinafter from a consideration of the detailed description which follows, taken together with the accompanying drawing wherein an embodiment of the invention is illustrated. It is to be expressly understood, however, that the drawing is for the purpose of illustration and description only, and is not designed as a definition of the limits of the invention.

Figure 1 is a schematic diagram of the novel noise elimination arrangement in connection with an automatic pilot system, and Figure 2 is a schematic showing of the flow of signal currents and of noise currents in the novel noise elimination arrangement of Figure 1.

The automatic steering system illustrated herein is generally similar to that fully described and claimed in copending application Serial No. 516,488, filed December 31, 1943, now U. S. Patent No. 2,625,348, issued January 13, 1953, and assigned to the assignee of the present invention. An automatic pilot for aircraft is generally a system of automatic controls. The system holds the aircraft on any selected heading, brings it back without overswing when momentary displacements occur, and simultaneously keeps the craft stabilized in pitch and in bank. While under automatic control, the aircraft can be made to climb, dive, and execute perfectly banked turns. However, for a better understanding of the invention and for purpose of simplicity only a single channel, the pitch control channel, has been illustrated. It is to be understood, however, that the invention is not limited to the particular automatic pilot system shown nor to the particular channel illustrated.

Referring now to the drawing, a servomotor 10 drives the elevator surfaces 12 through a servo clutch comprised of two co-engaging faces 14 and 16. Clutch face 14 connects through speed reducing gearing 18 with the elevator 12. A shaft 20 within a hollow gear 22 supports the clutch face 16. Hollow gear 22 fixedly mounts clutch face 16 for rotation therewith. The mounting, however, permits slidable or reciprocal motion of the clutch face relative to the gear. This sliding motion allows the clutch face 16 to engage or disengage with clutch face 14.

An enlarged end 24 on extension of shaft 20 retains one end of a coil spring 26 therein. The opposite end of the spring 26 abuts gear 22. Normally, spring 26 urgec clutch faces 14 and 16 out of engagement with each other.

A solenoid 30 engages the clutch faces 14 and 16 to define a driving connection between servomotor 10 and elevator surface 12. Leads 32 connect the solenoid 30 to a battery 34 through a switch 36. By closing the switch 36, solenoid 30 is energized and a plunger ejected from the solenoid to provide for the clutch engagement.

The servomotor 10 in this embodiment is of the conventional two phase type. One phase 40 is constantly energized from a suitable source of alternating current. The other phase 42 is variable and is energized from a servo amplifier 44.

The energization of the variable phase 42 of servomotor 10 corresponds to a combination of signals from several signal sources fed to the servo amplifier 44. These signal sources for the elevator channel comprise: (1) from a horizontal gyro, a pitch attitude signal that is proportional to changes in craft pitch from a predetermined pitch condition; (2) from an altitude device, an altitude change signal that is proportional to changes in craft elevation from a predetermined elevation; (3) a follow-up signal that is proportional to elevator displacement from a predetermined position; and (4) a rate signal from a rate generator that is proportional to the speed of movement of the servomotor.

The horizontal gyro 50, sensing changes in craft attitude from a predetermined pitch attitude, may be of a conventional type. A rotor 51, mounted within the rotor case 53 of the gyro 50 spins about an axis 55. A conventional erecting mechanism maintains the spin axis substantially vertical. A gimbal ring 56 by way of inner trunnions 58 supports the rotor 51 for oscillation about a first horizontal axis. A trunnion 60, supporting the gimbal ring 56, permits the rotor 51 to oscillate about a second horizontal axis that is perpendicular to the first horizontal axis. Trunnion 60 is journalled on the craft, itself, or within an instrument case secured to the craft.

The longitudinal axis or horizontal gyro 50 defined by the outer trunnion 60 constitutes the craft bank axis. The transverse axis constituted by the inner trunnions 58 defines the craft pitch axis.

An inductive device 62 generates at the gyro horizon 50 an electric signal proportional to the angle of craft pitch. The fixed stator 64 of inductive device 62 has two windings 66 and 68 wound in series opposed relation. Two leads 70 connect the windings 66 and 68 to a suitable source of alternating current. The rotor 72 coacting with stator windings 66 and 68 is a soft iron vane carried by trunnion 58.

Normally, rotor 72 is positioned relative to stator windings 66 and 68 in such a manner that the system is balanced, i. e., the exciting currents in the stator windings are equal and opposite. As a change in the craft pitch condition occurs, rotor vane 72 is moved angularly relative to the stator 64 to unbalance the voltages in the stator windings. This movement causes a signal to be generated at the stator. The signal reverses in phase as it passes through zero, thereby, defining by one phase a craft climb and by the other phase a craft descent.

Leads 80 connect a three phase wound stator 82 of a receiving device 84 with the stator 64 of transmitting device 62. A rotor winding 86, inductively coupled with the receiver stator 82, is mounted on a shaft 88 for angular motion relative to the stator. Varying the position of the rotor 86 relative to the stator 84 trims the craft in pitch. A change in craft pitch condition displaces rotor 72 angularly. The voltages of the transmitting stator windings 66 and 68 unbalanced by this displacement cause a like unbalance of receiver stator 82. The electrical axis of the rotor winding 86, then, is at some relation other than normal to the new resultant of the magnetic field caused by the unbalance. Thus, the signal induced within the rotor winding 86 is proportional to the change in craft pitch. Leads 90 conduct this signal to the servo amplifier 44 to energize servomotor 10 to impart a corrective movement to the elevator surfaces to return the craft to its predetermined pitch condition.

It may happen due to up-drafts, down-drafts, or various other conditions that the craft will experience a change in altitude level without a change in pitch attitude ever taking place. Therefore, an altitude control is provided to keep the craft at constant altitude. This altitude control signal is added in series with the pitch condition signal.

In the present embodiment, an altitude control unit 100 maintains the craft at a predetermined altitude by developing a signal proportional to craft deviation from a predetermined altitude. The bellows 102 of altitude control unit 100 is mounted for expansion and contraction within a casing 104. A conduit 106 communicates static pressure to the interior of the casing 104. Normally, the bellows is centered since both sides of it are exposed to static pressure.

When the craft has reached the desired altitude level a switch 110 is closed. Battery 112 then energizes coil 114 of solenoid 116, thereby moving armature 118 and closing the valve 120. A spring 122 moves the armature in the opposite direction to open the valve when the coil is deenergized.

With switch 110 closed, any change in static pressure due to altitude changes of the craft is communicated only to the interior of the bellows. Thus, bellows 102 expands or contracts depending upon whether the pressure rises or falls.

A shaft 124 transmits the motion of bellows 102 to a linearly displaceable winding 126. Winding 126, energized from a suitable source of alternating current, is normally centered with respect to a pair of fixed windings 128 and 129.

Fixed windings 128 and 129 are connected in series opposed relation. With the movable current conducting winding 126 centered with respect to fixed windings 128 and 129, equal and opposite voltages are induced within the fixed windings. The net value of the voltages, however, is zero. Movement of winding 126 from its central or null position induces more voltage in one of the windings 128 and 129 and less in the other. A difference in voltages exists; so current will flow in either one direction or the other.

After the craft has reached the desired altitude and switch 110 has been closed, any increase in craft elevation will manifest itself in a contraction of bellows 102. Winding 126 is moved inwardly from its null position relative to the fixed windings 128 and 129. This causes a differential signal flow in the fixed windings to provide a down-elevator control. On the other hand, a drop in craft elevation results in an expansion of bellows 102. Winding 126, then, moves outward relative to fixed windings 128 and 129. The differential signal thus developed provides up-elevator control. Leads 130 communicate the signal for energizing the servomotor 10 to impart a corrective movement to the elevator surfaces to return the craft to the predetermined elevation.

The above altitude device is illustrative only and briefly outlines a control as described in U. S. Patent No. 2,474,618, granted June 28, 1949, to R. L. Divoll.

A follow-up system 140 prevents over control of the elevator surface and stabilizes the system by preventing oscillation of the craft. The signal from the follow-up acts in opposition to the command signals from the horizontal and altitudinal reference devices.

The follow-up 140 is an inductive device having a wound stator 142 and a wound rotor 144. Stator 142 is energized from a suitable alternating current source. Rotor 144 is mounted for angular motion by servomotor 10. Normally rotor 144 is in a null position with respect to stator 142. In such null position, the electrical axis of the rotor is normal to the resultant magnetic field of the stator. Thus, normally, no signal appears at the rotor output even though current flows in the stator. However, movement of rotor 144 from its null position during its operation by servomotor 10 causes a signal to be induced in the rotor. Leads 146 conduct the signal from the rotor to energize the servomotor to act in opposition to the signals from the reference devices.

As a command or response signal from the pitch control and/or the altitude control energizes the servomotor 10, elevator surfaces 12 are displaced from normal position. At the same time servomotor 10 operates the follow-up device 140 until the combination of a follow-up signal and a rate signal (later to be described) is equal and opposite to the reference signal at which time further displacement of the elevator surfaces is stopped. As the craft returns to the reference position, the follow-up signal, being at this time greater than the reference signal, drives the servomotor to bring the elevator surfaces back to normal position, at which time the combination signals have dropped to zero. The tap 147 of resistor 148 across leads 146 permits the follow-up signal to be adjusted to give the most desirable action.

In addition to the follow-up 140, a rate generator 150 provides a further damping action to stabilize the elevator surfaces operation. The generator 150, suitably geared to servomotor 10, may be of a conventional type having two windings 150F and 151 at right angles to each other. The rotor of the generator may be a thin copper cylinder on an iron core. Winding 150F is constantly energized. No voltage is induced in winding 151 when the rotor is stationary. Upon rotation of the rotor, a signal proportional to the speed of rotation appears at the generator output. This signal occurs because rotation of the rotor distorts the lines of force from winding 151. The distortion varies with the speed of the rotor until a constant value is reached. Leads 152 conduct the output of the rate generator to energize the servomotor 10. The combination of rate and follow-up signal acts in phase opposition to the reference signals.

The foregoing description is briefly an automatic pilot system of the presently known type. It works well, but it does have the disadvantage of noise pick-up. Certain of the elements are near the cockpit section of the craft, others near the craft power plant, wing, or tail sections. All of the elements and associated circuits are subjected to noise conditions arising from close association with the various other electrical circuits, motors and generators. The lines joining the signal developers to each other and to the servo amplifier may be long and the circuits involved.

The present invention simply and effectively eliminates the noise problem.

Referring now to the drawing, the unwanted spurious signals such as noise are eliminated in a novel manner by the use of isolation transformers.

Leads 90, carrying the pitch condition signal, are twisted and run as a twisted pair of leads from the opposite ends of rotor 86 to a transformer 200 where they are connected to the opposite ends of a center tapped primary winding 201. Transformer 200 is at a position near to servo amplifier 44. Similarly, leads 130 from altitude controller 100 are twisted and run to the opposite ends of a center tapped primary winding 210 of a transformer 211 near servo amplifier 44. Leads 149 from tap 147 and lead 146 of follow-up device 140 are also twisted and run to the opposite ends of a center tapped primary winding 222 of a transformer 223 near servo amplifier 44. Twisted leads 152 connect winding 151 of rate generator 150 to the opposite ends of a center tapped primary winding 234 of a transformer 235 near the servo amplifier 44.

The secondary windings 240, 250, 260, and 270 of transformers 200, 211, 223, and 235, respectively, are all connected in series. One end of the secondary winding series is grounded by lead 280; whereas the other end, connected by lead 290 to servo amplifier 44, serves to feed the algebraic sum of the signals from the pitch attitude take-off 62, the altitude control take-offs 128 and 129, the follow-up rotor 144, and the rate generator winding 151 into the servo amplifier 44 to control servomotor 10.

Each center tap of the primary windings 201, 210, 222, and 234 is connected to a common ground wire 300. Obviously, each center tap may be separately grounded if this be desired.

The operation of the novel arrangement for eliminating the spurious voltages picked up by the circuit is readily apparent from an analysis of one circuit coupling such as illustrated in Figure 2.

The wires conducting signals to the coupling transformer are preferably twisted. Each wire, then, is subjected to the same set of conditions conducive to a pick-up of spurious signals. The resultant spurious signal currents will flow in the same direction in both wires since they are caused by the same conditions. Also, the flow of spurious signal current will be to a point of lower potential, herein to the ground through the center tap of the transformer.

The reference signal currents, on the other hand, are developed by a signal generator. One of the terminals of the conductor connected to the signal generator is of a polarity opposite to the polarity of the other terminal. Accordingly, the signal current in one conducting wire flows in a direction opposite to the flow in the other wire.

The spurious signal currents oppose each other in the primary winding, thus cancel out, and are grounded. Any flux tending to be produced in the transformer core by the spurious voltage in the portion of the primary winding above the center tap is cancelled by the flux tending to be produced by the spurious voltage in the portion of the primary winding below the center tap. As a result, no noise or corresponding spurious voltage is reproduced in the secondary winding.

The reference signal currents, on the other hand, are in a series aiding relationship in the primary winding. Accordingly, the reference signal is repeated in the secondary winding, i. e., a signal corresponding to the reference signal is induced in the secondary winding.

The secondary windings are independent of the long signal leads. Even though the impedance of the secondary winding circuit may be high when the secondary windings are connected in series, the short leads in a controlled portion of the circuit create no serious noise problem.

The primary winding is preferably balanced; the potential drop across each section of the transformer from the terminal to the center tap being equal. However, the spurious signals, even when the winding is not balanced, are substantially eliminated. As an arbitrary example, assume a primary winding of a grounded center tapped transformer has two hundred turns and the grounded center tap of the primary winding has been so placed that one section has one hundred and one turns while the other section has only ninety-nine turns. Since equal noise currents are placed on the inputs to both sections, all noise will be cancelled out except that developed by the two turn difference between the two transformer sections. It is clear that in this example the noise has been substantially eliminated, only two percent of the noise appearing in the secondary winding.

The lead wires are preferably used as a twisted pair. However, if the two wires are led through random different paths to the transformer there is still a good chance that the noise appearing in one lead wire will oppose and eliminate the noise appearing in the other lead wire.

A further advantage derived from the novel noise elimination arrangement is that it is possible to use more than one secondary winding with a given primary winding. This facilitates the coupling of one signal source into several circuits.

An additional advantage is that each lead, carrying the picked up extraneous voltages, is connected to ground through a relatively low impedance. As a result, the extraneous signal potential in the primary winding is always low.

It is clear that a novel circuit for eliminating spurious signals, such as noise signals, has been presented which effectively eliminates the problem of unwanted spurious signal pick-up in automatic pilot systems. The novel circuit is simple in construction and operation, light in weight, and easily maintained.

Although only one embodiment of the invention has been illustrated and described in detail, various changes and modifications in the form and relative arrangement of parts, which will now appear to those skilled in the art, may be made without departing from the scope of the invention.

What is claimed is:

1. In an automatic pilot system for a mobile vehicle, a servomotor for effecting control of said vehicle, a plurality of reference means for developing control signals for said servomotor, a coupling means associated with each reference means and including a center-tapped primary winding and a secondary signal repeater winding, a ground for the center-taps, conducting means connecting each reference means to its associated primary winding to communicate the control signal thereto, said secondary windings being connected in series to said servomotor, whereby any extraneous noise voltages picked-up by said conducting means cancel out and are grounded while the summation of the control signals appearing at the secondary windings controls said servomotor.

2. An automatic pilot system for mobile vehicles, comprising a servomotor for effecting control of said vehicle, a plurality of reference means for developing control signals for said servomotor, and coupling means for receiving said control signals and coupling the signals to said servomotor, said coupling means including an inductive device for each reference means, each inductive device having a primary winding for receiving said signal and a repeater winding for conducting said signal to said servomotor and a twisted pair of conductors connecting each primary winding with a respective reference means, each of said primary windings having a grounded center tap, whereby any noise signals accompanying said control signal are grounded and cancelled out while the control signal appears in said repeater winding, and said secondary windings being connected in series to said servomotor.

3. A positioning system comprising a controlled element and a plurality of controlling elements for developing signals for operating the controlled element, means utilizing a plurality of conductors for communicating the control signal from each controlling element to a coupling station, said conductors being arranged whereby they are subjected substantially equally to stray and undesirable voltages, means at said coupling station for eliminating said stray voltages, and means for connecting said coupling station and said controlled element whereby the control signal is passed to said controlled element.

4. An automatic control system for a craft, comprising power means for controlling said craft, a plurality of reference means for developing control signals indicative of a condition of said craft, a series signal chain for operating said power means by a summation of said signals, and means for operatively connecting said reference means together in parallel to said signal chain in series, said connecting means being subject to pick up of spurious signal voltages, and said last named means including means for eliminating the spurious voltages, whereby the summation of signals for said power means contains substantially only the control signals.

5. An automatic control system for a craft, comprising a plurality of reference means for developing control signals indicative of a condition of said craft, a plurality of coupling elements, means for connecting each of said coupling elements with a respective reference means, each coupling element containing a means for eliminating spurious signal voltages picked up by said connecting means, power means for controlling said craft, and means connecting said coupling units into a signal chain for operating said power means by a summation of said control signals whereby said spurious voltages are eliminated prior to the application of the signals to said signal chain so only said control signals operate said power means.

References Cited in the file of this patent

UNITED STATES PATENTS

| | | |
|---|---|---|
| 1,723,908 | Alexanderson | Aug. 6, 1929 |
| 2,110,159 | Landon et al. | Mar. 8, 1938 |
| 2,462,081 | Esval | Feb. 22, 1949 |
| 2,553,597 | Maroni | May 22, 1951 |